(12) United States Patent  
Huang

(10) Patent No.: US 8,120,210 B2  
(45) Date of Patent: Feb. 21, 2012

(54) METHOD AND DEVICE FOR LINE-SWITCHING OF MEMS MATRIX AND AMDF

(75) Inventor: Shikui Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 551 days.

(21) Appl. No.: 11/569,954

(22) PCT Filed: Mar. 10, 2006

(86) PCT No.: PCT/CN2006/000364  
§ 371 (c)(1),  
(2), (4) Date: Jun. 19, 2009

(87) PCT Pub. No.: WO2006/094463  
PCT Pub. Date: Sep. 14, 2006

(65) Prior Publication Data  
US 2009/0256656 A1     Oct. 15, 2009

(30) Foreign Application Priority Data  
Mar. 10, 2005 (CN) .......................... 2005 1 0053679

(51) Int. Cl.  
*H01H 9/30* (2006.01)
(52) U.S. Cl. ..................................... 307/135
(58) Field of Classification Search .................... 307/135  
See application file for complete search history.

(56) References Cited

U.S. PATENT DOCUMENTS

| | | | |
|---|---|---|---|
| 4,682,294 A | 7/1987 | Duc et al. | 364/492 |
| 4,992,904 A * | 2/1991 | Spencer et al. | 361/5 |
| 5,282,452 A | 2/1994 | Urushiwara et al. | 123/643 |
| 5,630,065 A | 5/1997 | Ishii | 395/200.06 |
| 2008/0091961 A1 * | 4/2008 | Cranford et al. | 713/300 |

FOREIGN PATENT DOCUMENTS

| | | |
|---|---|---|
| CN | 2175993 Y | 8/1994 |
| CN | 1311158 | 9/2001 |
| CN | 1441574 | 9/2003 |
| CN | 1504757 | 6/2004 |
| CN | 2671265 Y | 1/2005 |
| DE | 10 2005 027923 A1 | 3/2006 |
| EP | 99/19974 A | 4/1999 |

* cited by examiner

*Primary Examiner* — Robert L. DeBeradinis  
(74) *Attorney, Agent, or Firm* — Conley Rose, P.C.; Grant Rodolph

(57) ABSTRACT

Embodiments of the present invention provide a method and a device for line-switching in an automated main distribution frame (AMDF) which may solve the problem of contact point damage which may occur during hot switching of micro electromechanical system (MEMS) matrix, and further solve the corresponding problems which may occur during the line-switching in AMDF. In particular, the present invention is preferably embodied in the following way: when switching operation of a switch unit in MEMS is to be performed, the current introduced into MEMS matrix is firstly cut off, and is then recovered when the switching operation is finished, so as to prevent the "agglutinate" phenomena. Therefore, the present invention provides corresponding protection for the switching process of MEMS matrix relays in AMDF, and effectively prevents the "agglutinate" phenomena when the switch unit in MEMS matrix performs switching operation, whereby the reliability of AMDF is enhanced.

15 Claims, 3 Drawing Sheets

METHOD AND DEVICE FOR LINE-SWITCHING OF MEMS MATRIX AND AMDF

This application is a national phase application under 35 U.S.C. §371 of International Application No. PCT/CN2006/000364 filed 10 Mar. 2006, which claims priority to Chinese Patent Application No.: 200510053679 filed 10 Mar. 2005. The entire text of each of the above-referenced disclosures is specifically incorporated herein by reference without disclaimer.

FIELD

The present technology relates to line-switching of electronic or electric devices, more particularly, relates to method and device for line-switching of MEMS matrix and automated main distribution frame (AMDF).

BACKGROUND

During the implementation of AMDF, some cross matrices are implemented by means of micro electromechanical system (MEMS), i.e., using MEMS to form relay matrix to perform wiring line switching in AMDF.

As shown in FIG. 1, an AMDF provided with MEMS mainly includes a MEMS matrix 100, device cables 200 and user cables 300, wherein the MEMS matrix 100 is connected to the device cables 200 and the user cables 300, respectively. The device cables 200 are configured to connect with the devices in communication network, and the user cables 300 are configured to connect with the user terminals in communication network. Under the control of switching control part (not shown), wiring line switching between multiply lines of the device cables 200 and the user cables 300 can be performed, so as to switch on/off the line between device and user, and effectively control the communication service in network.

When hot switching is performed in MEMS matrix, the contact point thereof may be damaged, and "agglutinate" phenomena may occur, which leads to switch unit failure in this MEMS matrix. The hot switching means the switch units in MEMS matrix switches its state when current is passing by.

In the prior art of AMDF design, there is no technical solution which can provide protection for MEMS matrix to avoid hot switching damage thereof.

SUMMARY

In view of the above-described problems of the prior art, it is an object of the An embodiment of the present invention provides a method and a device for line-switching of ADMF and MEMS matrix which may effectively prevent the "agglutinate" phenomena from occurring during MEMS switching and guarantee the reliability of the switching.

An embodiment of the present invention provides a method for line-switching of MEMS matrix, including:
cutting off the current introduced into MEMS matrix before switching of a switch unit in MEMS matrix is performed;
recovering the current introduced into MEMS matrix when the switching of the corresponding switch unit in MEMS matrix is finished.

The cutting off the current includes:
cutting off the current introduced into both sides of the MEMS matrix.

An embodiment of the present invention further provides a device for line-switching of MEMS matrix, including: an MEMS matrix and a switch apparatus. The switch apparatus is connected to the access line of the MEMS matrix, and the switch apparatus switches the current introduced into the MEMS matrix before and after the switching of a switch unit in MEMS matrix is performed.

The switch apparatus includes relays.

The relays comprise Single-Pole Double-Throw (SPDT) relays.

There are two groups of switch apparatus installed on each access line on both sides of the MEMS matrix respectively.

An embodiment of the present invention further provides a method for line-switching of AMDF with MEMS matrix, including:
cutting off the current introduced into the MEMS matrix when a wiring line switching needs to be performed by means of a switch unit in MEMS matrix;
the MEMS matrix performing the wiring line switching;
recovering the current introduced into the MEMS matrix when the switching operation is finished.

The cutting off the current includes:
cutting off the current introduced into the MEMS matrix via device side or user side.

The cutting off the current is performed by means of a relay.

The relays may be provided separately, or existing in AMDF and connected to MEMS matrix.

An embodiment of the present invention further provides a device for line-switching of AMDF with MEMS matrix, including: a MEMS matrix, device cables, and user cables. Moreover, protection relays are provided between the device cables and the MEMS matrix, and between the user cables and the MEMS matrix.

The protection relays are connected to switching control part of the MEMS matrix, which controls the protection relays and the MEMS matrix to perform wiring line switching.

As can be seen from the above-described technical solution of the present invention, protection is provided for the switching process of MEMS matrix relays, and thus protection for the switching of MEMS matrix relays in AMDF is also provided, which may effectively prevent the "agglutinate" phenomena when a switch unit in MEMS matrix perform switching operation, whereby the reliability of AMDF is enhanced.

DETAILED DESCRIPTION OF PREFERRED EMBODIMENTS

The present invention considers the problem of contact damage which may occur during the MEMS matrix hot switching. The present invention is preferably embodied in the following way: when switching operation of a switch unit in MEMS is to be performed, the current introduced into the MEMS matrix is firstly cut off, and is then recovered when the switching operation is finished, so as to prevent the "aggluti-nate" phenomena.

An embodiment of the present invention provides a method for line-switching of MEMS matrix, including the following steps:

step 21: determining switching of a switch unit in the MEMS matrix needs to be performed;

step 22: cutting off the current introduced into the MEMS matrix;

when it is determined that switching of the switch unit in the MEMS matrix needs to be performed, the current introduced into both sides of the MEMS matrix is required to be cut off;

step 23: the switch unit in the MEMS matrix performing switching operation;

step 24: recovering the current introduced into the MEMS matrix when the switching operation of the switch unit in MEMS matrix is finished.

An embodiment of the present invention further provides a device for line-switching of MEMS matrix, and the device includes: a MEMS matrix and switch apparatus, wherein the switch apparatus are connected to the access line of the MEMS matrix, and used for switching the current introduced into the micro-electronic system when switching of a switch unit in the MEMS matrix needs to be performed. The switch apparatus may be SPDT relays.

There are two groups of switch apparatus provided on each access line on both sides of the MEMS matrix respectively. That is, a relay is additionally provided on each port of both sides of the MEMS matrix to realize the protection for MEMS matrix.

An embodiment of the present invention further provides a method for line-switching of AMDF with MEMS matrix, which includes the following steps:

(1) in AMDF, when a wiring line switching needs to be performed by means of MEMS matrix, for example, when lines on the device side and lines on the user side need to be switched on or off in AMDF, and the wiring line switching needs to be performed, firstly cutting off the current introduced into the MEMS matrix. The step further includes:

automatically cutting off the current introduced into the MEMS matrix via device side or user side by means of relays when it is required to switch the lines on device side or on user side by the MEMS matrix;

(2) the MEMS matrix performs wiring line switching by means of the MEMS matrix, i.e., using switching control part of the MEMS matrix to control any one of the lines to be switched on or off;

(3) recovering the current introduced into the MEMS matrix when the switching operation is finished, so as to guarantee the normal operation of the communication system.

Figure 1:
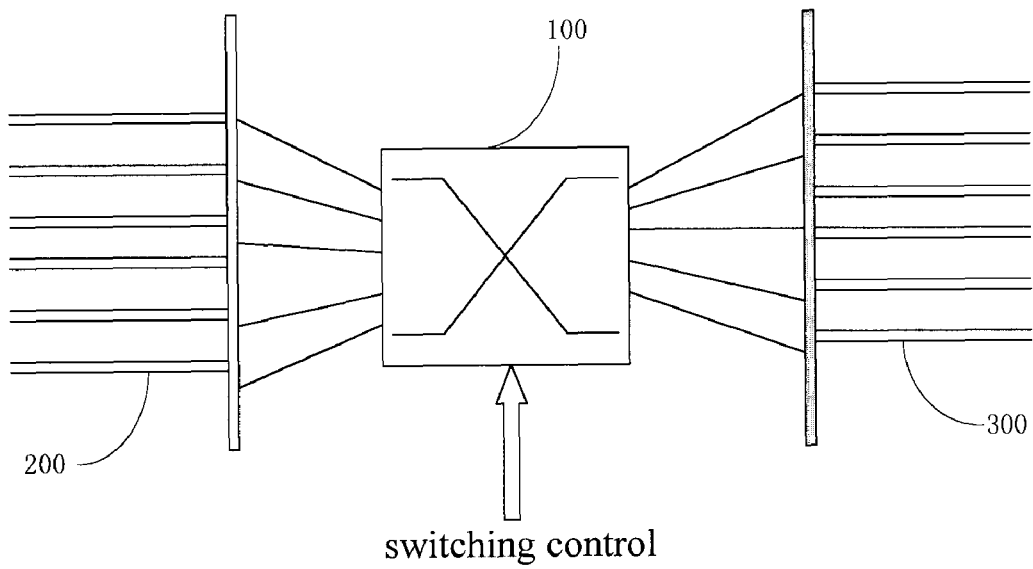
FIG. 1 is a schematic diagram which shows the configuration of an AMDF with MEMS matrix.
Figure 2:
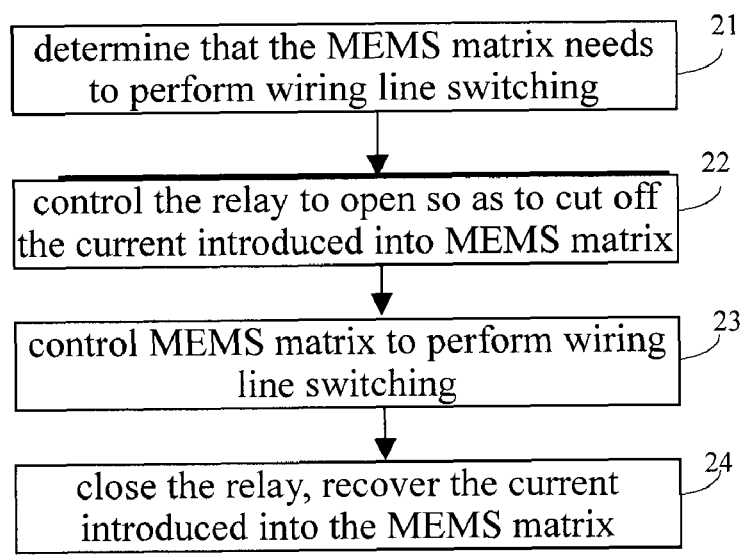
FIG. 2 is a flow chart which shows the method according to an embodiment of the present invention.
Figure 3:
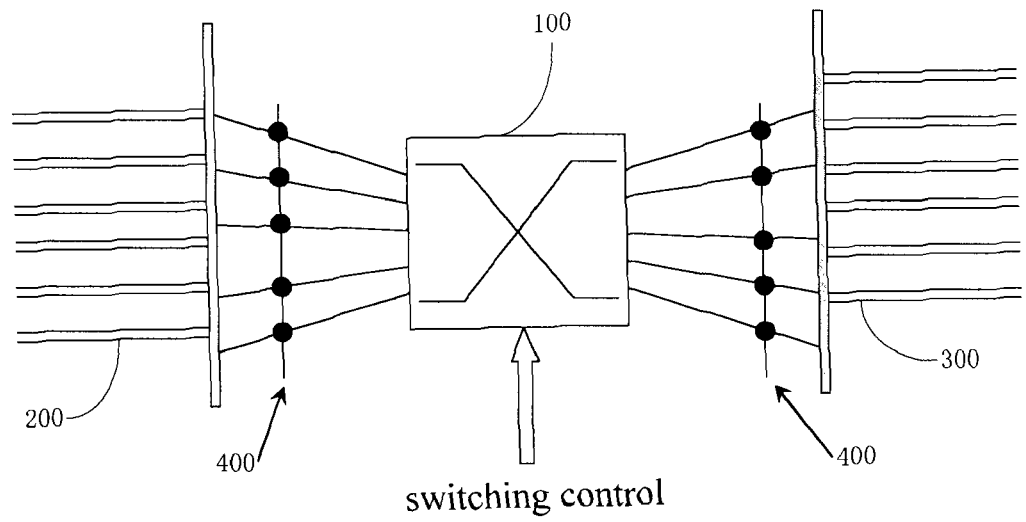
FIG. 3 is a schematic diagram which shows the configuration of AMDF according to an embodiment of the present invention.

An embodiment of the present invention further provides a line-switching device for AMDF with MEMS matrix, as shown in FIG. 3, including: a MEMS matrix 100, device cables 200, user cables 300 and protection relays 400. The protection relays 400 are mounted between the device cables and the MEMS matrix, and between the user cables and the MEMS matrix.

In the above-described device, the protection relays 400 are connected to switching control part (not shown) of the MEMS matrix 100. Before the control part controls the MEMS matrix 100 to perform wiring line switching, the protection relays 400 are controlled to be open, and when the wiring line switching is finished, the protection relays 400 are controlled to be close.

As shown in FIG. 3, on both sides of the MEMS matrix 100, a relay 400 is additionally provided on each port. When one or more switch units in MEMS matrix need to perform state-switching (for example, a certain line on the device side needs to be connected to one line on the user side via the MEMS matrix), the relays on both sides of the switch unit are firstly controlled to cut off the current introduced into the switch unit, and then the state-switching of the MEMS is performed. When the state-switching of this switch unit in the MEMS is finished, the relays on both sides of the switch unit are controlled to switch back to original state, i.e., connecting the path from the device side to the user side, so as to avoid the hot switching operation on the MEMS matrix, and enhance the reliability of the AMDF system.

In an embodiment of the present invention, the relays shown in FIG. 3 may be the relays already existing in the AMDF system, such as inside/outside testing relays in the AMDF system, or connection relays in the MEMS matrix. It should be appreciated that the present invention can also be embodied based on other relays in the system.

Figure 4:
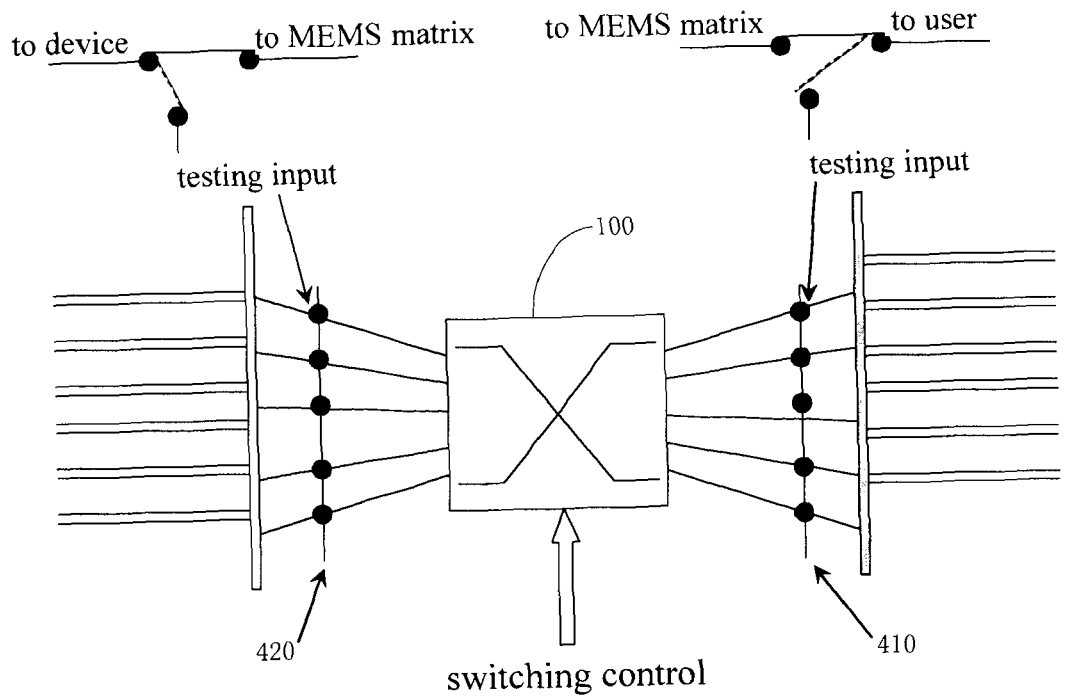
FIG. 4 is schematic diagram which shows the first embodiment of AMDF according to an embodiment of the present invention.

When the present invention is embodied based on the inside/outside testing relays, the configuration of the device is shown in FIG. 4. In the AMDF, each port is provided with two relays, one is used to test the user-line, referred to as outside testing relay 410; the other is used to test the port on user board, referred to as inside testing relay 420.

As shown in FIG. 4, each node uses a SPDT relay unit. The MEMS matrix is connected to the device side (the user side) during normal working time. When the MEMS matrix performs port-switching (i.e. implements switch unit switching), the inside/outside testing relays are respectively connected to testing access lines. In this way, the working current on the unit can be cut off when MEMS matrix is performing switching operation, thus not only protecting the MEMS matrix, but also guaranteeing the normal testing function of the system.

Figure 5:
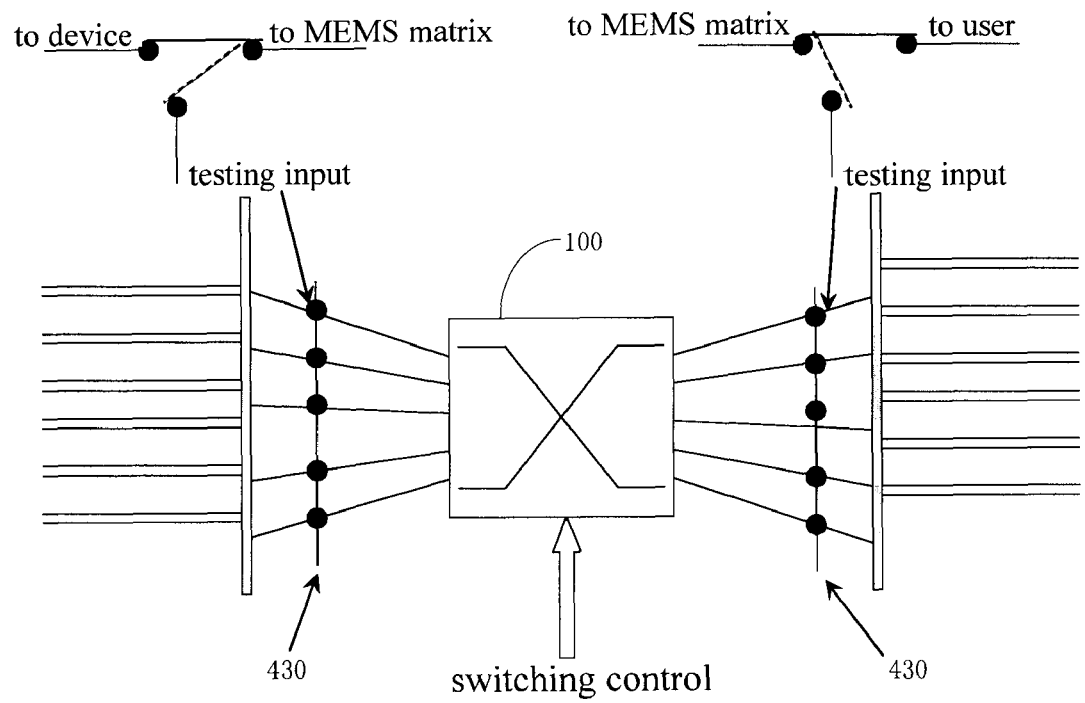
FIG. 5 is schematic diagram which shows the second embodiment of AMDF according to an embodiment of the present invention.

When the present invention is embodied based on the MEMS matrix connection testing relays, the configuration of the device is shown in FIG. 5. In general, after MEMS matrix finishes state-switching, it is required to ensure the correctness of the switching action. For this purpose, two testing relays 430 are needed to be mounted on both sides of MEMS matrix in the AMDF system, so as to test whether the switching in the MEMS is correct. The relays are referred to as MEMS matrix connection testing relays.

Each node uses a SPDT relay unit. The MEMS matrix 100 is connected to the device side (or the user side) during the normal working time. When a certain switch unit in the MEMS matrix 100 needs to perform state-switching, firstly, the MEMS matrix connection testing relay 430 corresponding to the switch unit in the MEMS matrix is connected to a testing input signal, so as to disconnect this switch unit from external line of input current, thereafter, switch unit in MEMS performs state-switching. In addition, after the switching action has finished, the MEMS matrix connection testing relays 430 are used to test whether this action is correct, and after everything is ok, the MEMS matrix connection testing relays turn back to its original state.

As stated above, embodiments of the present invention provide effective protection for MEMS matrix switching, and solves the "agglutinate" problem during MEMS matrix hot switching in AMDF.

It should be understood that the examples and embodiments described above are for illustrative purposes only and that various modifications or changes in light thereof will be suggested to persons skilled in the art and are to be included within the spirit and scope of this invention.

What is claimed is:

1. A method for line-switching of micro electro-mechanical systems (MEMS) matrix, comprising:

cutting off the current introduced into the MEMS matrix by controlling switch apparatuses before switching of a switch unit in the MEMS matrix is performed, wherein the switch apparatuses are each provided on only one access line of the MEMS matrix and provided on only one port of the MEMS matrix; and recovering the current introduced into the MEMS matrix when the switching of the corresponding switch unit in the MEMS matrix is finished.

2. The method according to claim 1, wherein the method is used for line-switching of automated main distribution frame (AMDF) with MEMS matrix, and wherein the switch apparatuses each are mounted between device cables and the MEMS matrix or between user cables and the MEMS matrix.

3. The method according to claim 1, wherein the switch apparatuses are Single-Pole Double-Throw relays.

4. The method according to claim 1, further comprising: testing whether the switching of the switch units in the MEMS matrix is correct by providing testing relays corresponding to the switch units in the MEMS matrix.

5. The method according to claim 1, wherein before cutting off the current introduced into the MEMS matrix, the method further comprising: determining switching of a switch unit in the MEMS matrix needs to be performed.

6. A device for line-switching of micro electro-mechanical system (MEMS) matrix comprising:

a MEMS matrix; and a plurality of switch apparatuses each provided on only one access line of the MEMS matrix and provided on only one port of the MEMS matrix;

wherein said switch apparatus switches the current introduced into the MEMS matrix before and after the switching of a switch unit in the MEMS matrix is performed.

7. The device for line-switching of MEMS matrix according to claim 6, wherein said switch apparatus comprises relays.

8. The device for line-switching of MEMS matrix according to claim 7, wherein said relays comprise Single-Pole Double-Throw (SPDT) relays.

9. The device for line-switching of MEMS matrix according to claim 8, wherein there are two groups of the switch apparatuses on each access line on each side of the MEMS matrix.

10. The device for line-switching of MEMS matrix according to claim 7, wherein there are two groups of the switch apparatuses on each access line on each side of the MEMS matrix.

11. The device for line-switching of MEMS matrix according to claim 6, wherein, there are two groups of said switch apparatus provided on each access line on both sides of said MEMS matrix respectively.

12. An automated main distribution frame (AMDF) system for line-switching, the AMDF system comprising:

a micro electro-mechanical system (MEMS) matrix connected to device cables, user cables, a switching control part, and protection relays, wherein the device cables each are configured to connect to a device in a communication network, wherein the user cables are configured to connect to user terminals in the communication network, wherein the switching control part is configured to control a switch unit in the MEMS matrix that performs wiring line switching between access lines, wherein the protection relays each connect to the switching control part and are mounted between the MEMS matrix and the device cables or between the MEMS matrix and the user cables, wherein the protection relays are controlled to cut off current introduced into the MEMS matrix before the switching control part controls the MEMS matrix to perform wiring line switching, and wherein the protection relays are configured to recover the current introduced into the MEMS matrix when the wiring line switching is finished.

13. The AMDF system according to claim 12, wherein each side of the switch unit of the MEMS matrix is provided with one protection relay.

14. The AMDF system according to claim 12, wherein testing relays corresponding to the switch units in the MEMS matrix test whether the switching of the switch units in the MEMS matrix are correct.

15. The AMDF system according to claim 12, wherein the protection relays are Single-Pole Double-Throw relays.

* * * * *

UNITED STATES PATENT AND TRADEMARK OFFICE
CERTIFICATE OF CORRECTION

PATENT NO. : 8,120,210 B2
APPLICATION NO. : 11/569954
DATED : February 21, 2012
INVENTOR(S) : Shikui Huang Page 1 of 1

It is certified that error appears in the above-identified patent and that said Letters Patent is hereby corrected as shown below:

Cover Page item (57) Abstract Line 5 Should read: "electro-mechanical."

Signed and Sealed this
Tenth Day of April, 2012

David J. Kappos
*Director of the United States Patent and Trademark Office*